United States Patent [19]

Goeldner

[11] 4,444,675

[45] Apr. 24, 1984

[54] ALKALINE SCALE ABATEMENT

[75] Inventor: Richard W. Goeldner, Fort Walton Beach, Fla.

[73] Assignee: Mechanical Equipment Company, Inc., New Orleans, La.

[21] Appl. No.: 350,004

[22] Filed: Feb. 18, 1982

Related U.S. Application Data

[63] Continuation-in-part of Ser. No. 283,939, Jul. 16, 1981, abandoned.

[51] Int. Cl.$^3$ .................................... C02F 5/02
[52] U.S. Cl. ........................... 252/175; 203/7; 210/696; 210/697; 210/698; 210/699; 210/700; 210/701
[58] Field of Search ................ 203/7; 210/696, 697, 210/698, 699, 700, 701; 252/175

[56] References Cited

U.S. PATENT DOCUMENTS

| | | | |
|---|---|---|---|
| 3,218,241 | 11/1965 | Checkovich | 210/699 X |
| 3,420,775 | 1/1969 | Cadwallader | 210/48 |
| 3,607,666 | 9/1971 | Roller | 203/7 |
| 3,748,234 | 7/1973 | Pottharst, Jr. | 202/187 |
| 3,810,834 | 5/1974 | Jones et al. | 210/58 |
| 4,002,538 | 1/1977 | Pottharst, Jr. | 203/10 |
| 4,188,291 | 2/1980 | Anderson | 210/699 X |
| 4,255,259 | 3/1981 | Hwa et al. | 252/180 X |
| 4,260,461 | 4/1981 | Pottharst, Jr. | 203/7 |

OTHER PUBLICATIONS

Powell, Water Conditioning for Industry, pp. 473–475, (McGraw–Hill 1954).
Betz Handbook of Industrial Water Conditioning, Chapter 14–"Recarbonation", (1945).
Betz Handbook of Industrial Water Conditioning, Chapter 13–"Recarbonation", (1953).
Ellis et al., "Alkaline Scale Abatement by Carbon Dioxide Injection", Environmental Science & Technology, vol. 5, No. 4 at 350, (1971).
"The Effect of Plant Operating Conditions on Recirculating Brine pH, and the Effect of Brine pH on the Activity of Scale Control Activities"–Finan et al.–Ciba–Geigy (UK) Ltd., (1978)–Circular DB 6.7.

Primary Examiner—Thurman K. Page
Attorney, Agent, or Firm—Wood, Dalton, Phillips, Mason & Rowe

[57] ABSTRACT

Formation of alkaline scale in water distillation equipment is reduced or substantially eliminated without a significant increase in equipment corrosion rate by dissolving an effective amount of carbon dioxide in brine which is boiling or flashed or which has been boiled or flashed and which contains an effective amount of a high temperature threshold effect chemical scale control additive.

45 Claims, 3 Drawing Figures

Fig. 3.

ALKALINE SCALE ABATEMENT

CROSS-REFERENCE TO RELATED APPLICATION

This is a continuation-in-part of copending, commonly assigned application Ser. No. 283,939 filed July 16, 1981 now abandoned.

BACKGROUND OF THE INVENTION

1. Field of the Invention

This invention relates to scale abatement and, more specifically, this invention relates to a method and apparatus for substantially reducing or eliminating the rate and extent of formation of calcium carbonate and magnesium hydroxide scale in water distillation equipment.

2. Brief Description of the Prior Art

Much research has been directed to the elimination of alkaline scale formation during distillation of water which contains dissolved salts of magnesium and/or calcium, such as brackish water or seawater. In all types of seawater distillation equipment, heating of seawater to a temperature up to about 180° F. produces scale which is predominantly calcium carbonate ($CaCO_3$). At temperatures about about 200° F., magnesium hydroxide [$Mg(OH)_2$] scale predominates. At temperatures between about 180° F. and 200° F., either type of scale, or mixtures thereof, may be encountered. Calcium carbonate and magnesium hydroxide scales are collectively referred to a alkaline scales.

Since scale is a heat insulator, even a thin layer of scale on heat transfer surfaces or other components of process equipment significantly reduces the heat transfer capability of the components. Accumulation of scale on evaporator tubes may result in significant reductions in throughput capacity, increases in energy input per unit of throughput capacity, or both. Scale accumulation results in frequent shutdowns, the cost of which is substantial, as is the direct cost of cleaning scaled tubes.

Various means have been utilized in attempts to reduce or eliminate scale formation in seawater distilling units, with limited success. In attempts to destroy total alkalinity (the sum of bicarbonate ($HCO_3^-$), carbonate ($CO_3^{-2}$) and hydroxyl ($OH^-$)ions) in evaporator brine, acids, generally mineral acids, have been added to feed streams in distillation units. However, effective control of scale formation by continuous acid addition is difficult to attain due to the highly corrosive nature of mineral acids and the sensitivity of scaling reactions to acid concentration. Precise control of acid dosing is required, since introduction of excess acid into a seawater feed stream results in equipment corrosion, while introduction of insufficient acid results in rapid scale formation. Continuous acid addition is a costly process and, unless carbon dioxide formed in the chemical reaction between seawater alkalinity and acid is substantially completely removed, as by deaeration, rapid rates of corrosion of copper alloy and steel evaporator components result. This is impractical in many seawater distillation installations.

The use of inorganic or organic chemical scale control additives to prevent alkaline scale formation has met with only limited success, and is often not effective at relatively high brine temperatures. Thus, while many commercially available scale control additives provide good control of calcium carbonate scale formation, such chemicals have been only marginally effective in controlling magnesium hydroxide scale formation at relatively high temperatures.

It has long been recognized that liberation of carbon dioxide from brine as a result of boiling promotes decomposition of bicarbonate and carbonate ions in the brine, ultimately resulting in the formation of hydroxyl ions and insoluble magnesium hydroxide scale at high temperatures. Thus, attempts have been made to inhibit hydroxyl ion formation by the addition of pressurized carbon dioxide to brine being heated under nonboiling conditions, such as in multistage flash evaporators, in order to inhibit the hydroxyl ion formation reaction.

Although this has achieved some success on a pilot scale in multistage flash evaporator units wherein brine is heated under pressure and flashed in a chamber separate from the heating stage, this approach has not been successful in other types of evaporator units in which boiling brine directly contacts heat transfer surfaces. Further, the presence of free (chemically uncombined) carbon dioxide promotes corrosion, and has made carbon dioxide addition commercially impractical in all types of evaporating apparatus.

Checkovich U.S. Pat. No. 3,218,241 (Nov. 16, 1965), the disclosure of which is hereby incorporated by reference, describes a method of controlling scale formation in multi-stage flash (MSF) fresh water recovery systems by maintaining the concentration of carbon dioxide in pressurized brine being heated at a level sufficient to inhibit the hydrolysis of bicarbonate ions to carbonate ions. The Checkovich patent states that this may be accomplished by recycling carbon dioxide released during distillation of the feed seawater.

The Checkovich patent teaches that formation of scale can be retarded by addition of glassy phosphates or other chemicals having chelating or wetting properties. Addition of acids may be required at high temperatures.

However, the disclosed method of Checkovich No. 3,218,241 requires a relatively low pH (e.g. 7.5 or below) and extremely high free carbon dioxide concentrations (e.g. 4–15 ppm). Such conditions accomplish scale abatement only at the cost of relatively high corrosion rates of commonly used steel and copper alloy process equipment components. As a result, this approach to the problem of controlling alkaline scale formation has seen little or no commercial use.

Summarizing, the problem of controlling alkaline scale formation in commercial seawater distilling plants has been approached in several ways. Plants which are operated at relatively low temperatures (i.e. below about 190° F.) may use the addition of polyphosphates or other chemical scale control additives to control the formation of calcium carbonate scale. Operation above about 190° F. has required continuous acid addition to feedwater followed by deaeration to destroy the alkalinity of feedwater and to remove carbon dioxide from the system.

Alternatively, continuous addition of a chemical scale control additive has been combined with mechanical means (e.g. sponge rubber balls of the Taprogge type) for removing soft scale from heat transfer surfaces, or with partial destruction of feedwater alkalinity by continuous acid addition followed by deaeration for carbon dioxide removal.

Prior systems generally have required periodic shutdown with circulation of acid to remove accumulated scale. The frequency of shutdown has been inversely related to the effectiveness of the chemical and/or mechanical treatment employed. In general, an attempt is made to strike a balance between the cost, complexity and corrosion risks of the method of scale control pretreatment employed, and the cost, lost production and corrosion associated with shutdown and periodic acid cleaning.

SUMMARY OF THE INVENTION

It is an object of the present invention to overcome one or more of the problems described above.

According to the present invention, at least one high temperature threshold effect chemical scale control additive and carbon dioxide are dissolved in the brine of a water distillation unit or the like such that the concentration of free (uncombined) carbon dioxide in the brine is maintained at a very low level (e.g. less than about 1 ppm), while (in the case of operation on seawater) the pH of the brine is maintained between about 8.7 and 9.3, and the P alkalinity of the brine is maintained at between about 20 and 90 ppm, expressed as $CaCO_3$. Such treatment does not reduce the total alkalinity of the brine, but effectively reduces the brine hydroxyl ion and carbonate ion concentrations from those existing when the chemical additive is used alone and, thus, substantially eliminates scaling, by significantly reducing conversion of bicarbonate ion to carbonate ion and, ultimately, to hydroxyl ion.

The invention is especially effective in evaporator systems wherein brine is boiled by contact with hot heat transfer surfaces, such as in vapor compression seawater distillation systems. Dissolution of carbon dioxide in brine which has lost some $CO_2$ as a result of an evaporative process reduces the effective loss of $CO_2$, thus reducing the upward shift of the hydroxyl ion concentration by inhibiting the decomposition of bicarbonate ion to such an extent that the presence of the chemical scale control additive substantially completely eliminates formation of calcium carbonate and magnesium hydroxide scales. Thus, the two major causes of alkaline scale formation are neutralized.

Thus, presently commercially available chemical scale control additives are rendered effective in substantially completely eliminating alkaline scale formation.

This synergistic result is obtained without a significant increase in corrosion rate, since the total alkalinity of the brine is not reduced, and any reduction in the brine pH is not sufficient to significantly increase the corrosion rates of materials of construction commonly used in distillation equipment. Thus, maintenance of maximum throughput capacity over extended operating periods, and substantial reduction in the frequency of shutdown, are possible. The distillate and brine are not significantly more corrosive than they are with threshold chemical treatment alone, and are much less corrosive than encountered with carbon dioxide treatment alone.

Other objects and advantages of the invention will be apparent from the following detailed description taken in conjunction with the drawings and the appended claims.

DETAILED DESCRIPTION OF THE INVENTION

The present invention provides a method and apparatus for reducing or substantially eliminating alkaline scale formation in any of various types of process equipment in which water which contains dissolved salts of magnesium and/or calcium which are precipitable as scale in the presence of bicarbonate decomposition products, is brought into contact with process equipment surfaces, during an evaporative process. The invention is especially advantageous in seawater desalination plants, but may have utility in a variety of other types of process equipment, and can be applied to the production of bottled distilled water or water for pharmaceutical use, or in the concentration of cooling tower blowdowns by evaporation, for example.

Reference herein to "seawater" is to be understood to include brackish water. The term "brine" refers to water which contains dissolved salts of magnesium and/or calcium, and which has been subjected to evaporation. As used herein, the term "evaporation" denotes a process by which a volume of water loses carbon dioxide concurrently with a loss of pure water.

Calcium carbonate scale results from the thermal decomposition (at relatively low temperatures) of bicarbonates and reaction or resulting carbonates with calcium present in seawater, as follows:

$$2HCO_3^- \rightleftharpoons CO_2 \uparrow + CO_3^{-2} + H_2O \qquad (1)$$

$$Ca^{+2} + CO_3^{-2} \rightleftharpoons CaCO_3 \downarrow \qquad (2)$$

Carbonate ions appear in brine at pH levels of about 8.3 or higher.

Heating of seawater at higher temperatures causes carbonates to react with water to release additional carbon dioxide and to form hydroxyl ions, which precipitate as magnesium hydroxide, as follows:

$$CO_3^{-2} + H_2O \rightleftharpoons CO_2 \uparrow + 2OH^- \qquad (3)$$

$$Mg^{+2} + 2OH^- \rightleftharpoons Mg(OH)_2 \downarrow \qquad (4)$$

Boiling of seawater promotes scale formation by the reactions given above. The degree to which the foregoing reactions occur increases with increases in boiling temperature, with increases in retention time, and with increases in concentration factors. $CO_2$ liberated from brine by boiling is conventionally removed from evaporator systems by venting to the atmosphere with other noncondensable gases, such as nitrogen and oxygen.

According to the invention, and contrary to prior practice, it has been found that scale formation on heat transfer surfaces and other process equipment components can be substantially eliminated or minimized by dissolving $CO_2$ in brine which has been subjected or is being subjected to an evaporative process, and thus contains a substantial amount of carbonate ions resulting from decomposition of bicarbonates present in feed water, if the $CO_2$ is added to the brine simultaneously with or subsequent to evaporation of a portion thereof and if the brine also contains a selected high temperature threshold effect chemical scale control additive, under certain conditions set forth below.

The added CO₂ is preferably supplied to the brine by recycling at least a portion of the CO₂ liberated from the brine by boiling.

The $CO_2$ is dissolved in the brine, by means detailed below, such that the concentration of free (chemically uncombined) $CO_2$ in the brine is kept below about 1 ppm, and preferably below about 0.5 ppm. This is essential since the presence of free $CO_2$ enhances the tendency of dissolved $CO_2$ to be stripped from the brine during boiling. Stripped $CO_2$ tends to be carried to vapor spaces and distillate collection spaces, thus increasing corrosion rates.

The presence of dissolved carbon dioxide in the boiling brine of the evaporator shifts the equilibrium of equations (1), (2) and (3), above, to the left, thus inhibiting the decomposition of bicarbonate ions. In effect, the carbonate ions act as a "sponge" with respect to the carbon dioxide, avoiding loss thereof in the free form. Thus, the tendency for magnesium to precipitate as magnesium hydroxide is reduced or substantially eliminated. Further, the presence of the chemical scale control additive interferes with the precipitation reaction (2) above, generally by enhancing the solubility of calcium carbonate over prolonged periods of elevated temperatures, thus substantially preventing or minimizing the formation of calcium carbonate scale.

True synergism between the chemical additive and dissolved carbon dioxide is attained since, while the presence of the chemical alone eliminates or reduces calcium carbonate formation, it inhibits the rate of formation of magnesium hydroxide scale only to a limited degree, which may be insufficient in many plants. Treatment with carbon dioxide alone to the extent necessary to control alkaline scale formation, as suggested in Checkovich U.S. Pat. No. 3,218,241, drastically lowers the brine pH and increases the free carbon dioxide concentrations resulting in intolerable corrosion rates.

According to this invention, a high proportion (e.g. above about 70-75%) of the reduction of alkaline scaling rate is accomplished by the chemical scale control additive, but carbon dioxide addition in combination with the chemical so as to establish brine P alkalinities and pH within specific ranges effects substantially complete elimination of scale formation.

It is characteristic of a system employing the method of the present invention that total brine alkalinity, measured as the total concentration of hydroxyl, carbonate and bicarbonate ions, is not decreased by adding carbon dioxide to brine containing the threshold chemical additive. However, the concentrations of hydroxyl ion and carbonate ion are reduced by inhibition of the decomposition of bicarbonate ion to carbonate ion by the addition of carbon dioxide. Elimination of bicarbonate ion decomposition is not necessary.

Total alkalinity, as defined above, is conventionally referred to as the "M alkalinity" and is expressed as ppm equivalent $CaCO_3$ as determined by titration with a standard mineral acid using a methyl orange indicator at pH 4.5 at room temperature. (While some standard texts call for an end point pH of 4.3, it is conventional in the seawater distillation art to use the pH 4.5 end point.) The "P alkalinity" of brine is expressed as ppm equivalent $CaCO_3$ as determined by titration with a standard mineral acid using a phenolphthalein indicator at pH 8.3 at room temperature.

Standard procedures for determining the P and M alkalinities of brine are described at Powell, Water Conditioning for Industry, pp. 473-475 (McGraw-Hill 1954), the details of which are incorporated herein by reference.

In the practice of this invention in connection with seawater distillation, the P alkalinity of brine is maintained at between about 20 and 90 ppm, and preferably between about 30 and 80 ppm, and brine pH is maintained between about 8.7 and 9.3, by addition of a high-temperature threshold effect chemical scale control additive in combination with carbon dioxide. The brine's M alkalinity is not decreased.

In the application of the invention to distillers operating on freshwater, the addition of carbon dioxide to brine treated with the threshold chemical additive may cause little or no reduction in P alkalinity, but a significant increase in M alkalinity along with a small reduction in pH (e.g. about 0.2 to 0.5 units) as compared with brine treated with threshold chemical additive alone.

The selection of P alkalinity and pH within the recited ranges will depend upon operating variables such as the type of evaporator, materials of evaporator construction, operating temperature, degree of dilution of brine with feed in multistage flash units, etc.

It has been found that operation according to the invention generally results in the value (2P-M) being maintained below zero.

While it is preferred that gaseous carbon dioxide be injected directly to brine, other means of providing carbon dioxide to the brine may be employed. For example, excellent results have been obtained by dissolving gaseous carbon dioxide in a water stream, such as a minor portion of the feed seawater stream, and thereafter directing the treated water stream to the brine in the evaporator. Thus, even though a minor amount of the feed may be treated with carbon dioxide prior to evaporation, the brine as a whole is to be considered as being treated with carbon dioxide substantially simultaneously with or subsequent to evaporation.

Carbon dioxide may be obtained from any of various sources, such as bottled $CO_2$, flue gas from which contaminants have been removed, etc. However, it is preferred to recycle carbon dioxide which is liberated from brine during boiling or flashing. Only limited amounts of the noncondensable gases removed from the system should be recycled, however, as large amounts of noncondensables other than $CO_2$, such as $O_2$ and $N_2$, interfere with heat transfer in the evaporator by forming a blanket over heat transfer surfaces.

An amount of $CO_2$ sufficient to interfere with (and thus substantially inhibit) bicarbonate ion decomposition yet insufficient to result in the presence of substantial amounts of free (chemically uncombined) $CO_2$ should be introduced to the brine. In practice, it has been found that a $CO_2$ introduction rate of about 0.44 lb/hr, based on a seawater feed rate of about 690 gal/hr for a distillate output rate of about 300 gal/hr in a vapor compression (VC) distillation unit, with a chemical additive dosing rate equal to or below that recommended by the manufacturer, was satisfactory in reducing the P alkalinity to 86 ppm from a value of 127 ppm. The pH was reduced to 9.25 from 9.5, without recycling of vent gases. Free $CO_2$ in the brine should be less than about 1 ppm, and preferably less than 0.5 ppm. Although introduction of $CO_2$ to brine may tend to decrease the brine pH, it has been found that pH reductions of only about 0.2 to 1.0 pH units result from addition of the $CO_2$ necessary to bring the brine P alkalinity within the desired range of 20-90 ppm. The pH of brine treated with chemical additive and $CO_2$ should be between about 8.7 and 9.3, measured at room temperature.

The efficiency of the $CO_2$ injection system is, of course, a factor in determining how efficiently $CO_2$ is absorbed by the brine.

The inventive method is particularly applicable to seawater distillation processes operating at brine temperatures of 190° F. or above, such as typically encountered in multi-stage flash (MSF) distillation apparatus. However, the method is applied with excellent results to vapor compression (VC) types of distillation equipment which, although they may operate at significantly lower brine temperatures compared to MSF units, can experience relatively severe environments with respect to scaling.

As noted above, the invention resides in the dissolution in brine of $CO_2$ in combination with one or more selected high-temperature chemical scale control additives which provide a threshold scale inhibiting effect by maintaining a high concentration of carbonate ions in solution in the presence of calcium and magnesium ions. Chemicals with only wetting and sequestering properties are not suitable.

It is believed that inhibition of scaling according to the invention is a result, at least in part, of modification of the surface of scale crystals by the chemical additive as scale is in the process of forming, whereby the rate of crystallization is reduced. Microscopic studies have revealed substantial crystal distortion when threshold effect chemical scale control compounds are present.

A variety of suitable additives are commercially available, and include polymers and copolymers of maleic acid, polyphosphonates, phosphonic acid derivatives, aminophosphonic acid derivatives, polyacrylic and polymethacrylic acid derivatives, and polyesters.

Polyphosphates, however, are not suitable for use in connection with this invention since, at temperatures greater than about 190° F., they revert to the orthophosphate form and can precipitate with calcium or iron present in the brine. They also fail to control the formation of magnesium hydroxide scale.

Mineral acids are not suitable for use in this invention.

A preferred chemical additive is a hydrolyzed polymaleic anhydride marketed by Ciba-Geigy Corporation (Ardsley, N.Y.) under the trademark BELGARD EV or EVN. This material is described in U.S. Pat. No. 3,810,834, the disclosure of which is incorporated herein by reference. Another very effective chemical treating agent is marketed by American Cyanamid Company under the trade designation P80, and is believed to comprise a copolymer of maleic acid and sodium allyl sulfonate. Other suitable chemical treating agents include compounds marketed by Monsanto Company under the trademark DEQUEST. The commercial product DEQUEST 2010 (which comprises 1-hydroxylethylidene-1-diphosphonic acid) is an example. Also, the product of Pfizer, Inc. designated FLOCON (e.g. FLOCON 247) and those of Mechanical Equipment Co. (New Orleans, Louisiana) designated M209 and M235 are suitable.

The BELGARD, Mechanical Equipment Co. M209, and DEQUEST products identified above are preferred. Those skilled in the art will recognize that the performance of various suitable chemical additives will vary; however, the method of the present invention will improve the performance of all polymers of the type described above.

The dosing rates of chemical scale control additives identified above can readily by empirically determined, and it has been established that dosing rates lower than the rates recommended by the respective manufacturers of the additives provide acceptable results when used in combination with added carbon dioxide according to the method of this invention.

EXAMPLES

The following detailed examples are intended to illustrate the practice of the present invention, but the scope of the invention is not to be considered to be limited thereby.

EXAMPLE 1

Vapor Compression Distillation

Figures 1, 2:
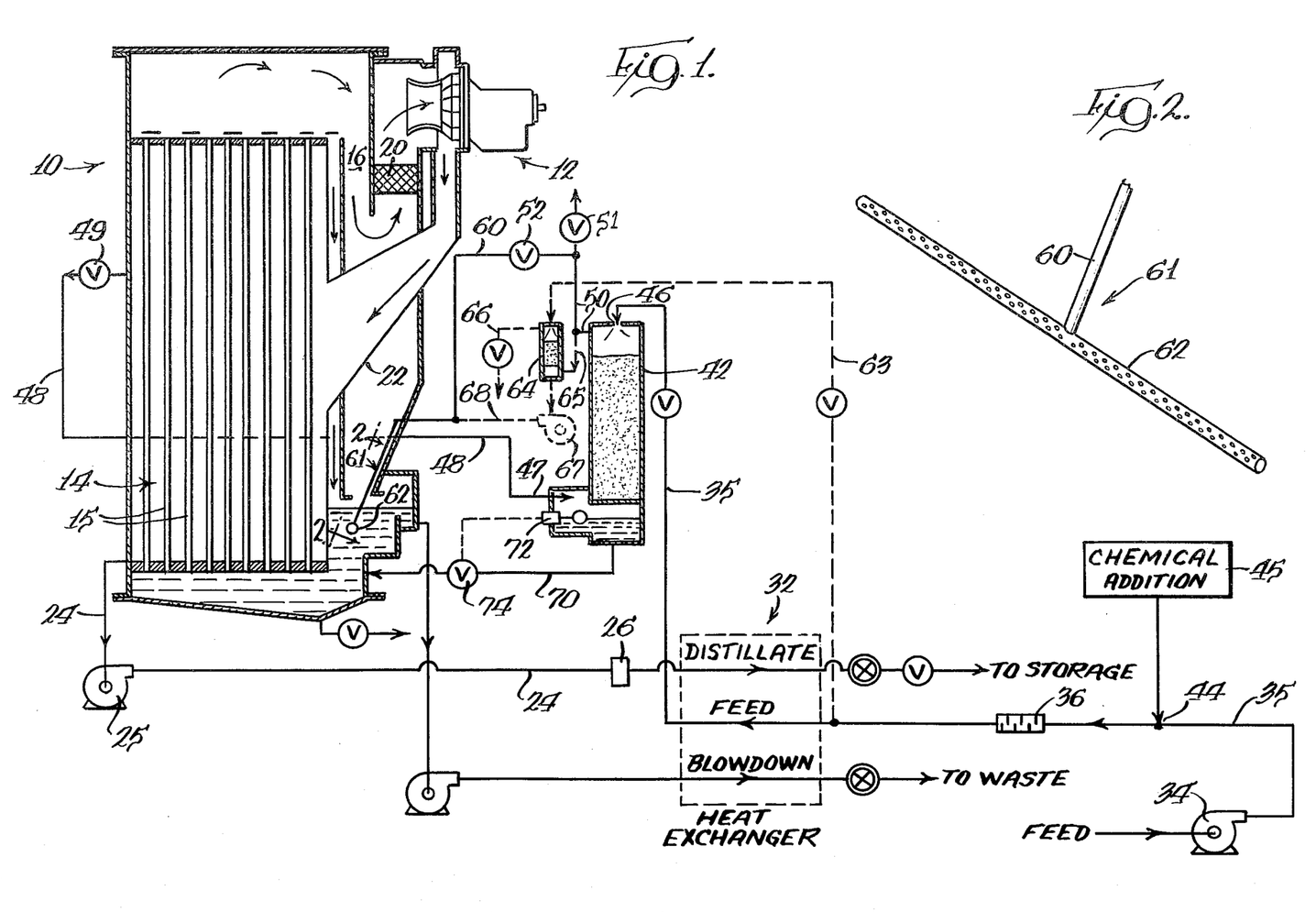
FIG. 1 is a schematic diagram partially in section, of a vapor compression distillation apparatus embodying the present invention.
FIG. 2 is a fragmentary view of a carbon dioxide injection manifold of the apparatus of FIG. 1, taken generally along line 2—2 of FIG. 1.

FIG. 1 illustrates a vapor compression type of seawater evaporator which has been modified to employ the method of this invention. While the apparatus of FIG. 1 will be described in detail, it is to be understood that the method of the invention is not limited to the use of the specific apparatus of FIG. 1, but may be embodied in a wide variety of distillation or other evaporation equipment, as detailed below.

The vapor compression distillation unit of FIG. 1 is a modified version of the units described in Pottharst, Jr. U.S. Pat. Nos. 3,748,234, 4,002,538 and 4,260,461, and disclosures of which are incorporated herein by reference. The distillation unit includes a shell and tube evaporator, generally designated 10, and an associated vapor compressor 12. In such a system, water on the tube side of a calandria or tube bundle 14, which comprises a plurality of tubes 15, is vaporized by heat exchange with condensing steam on the shell side of the evaporator 10. The vapor produced in the tubes passes from the upper end of the calandria 14 downwardly into a downtake 16 and upwardly through a demister 20 to the suction side of the compressor 12. The vapor is compressed in the compressor 12 and is then discharged via a conduit 22 to the shell side of the evaporator 10, where most of the vapor is condensed by contact with the tubes 15. Distillate (condensate) is removed through a line 24 by a distillate pump 25. The distillate flows through a meter 26 and a heat exchanger, generally designated 32, to storage.

Filtered feed water is pumped by a feed pump 34 through a line 35 having an integral mixing device 36 to the heat exchanger 32. The feed water is heated by heat exchange with hot distillate and blowdown, and fed to a deaerator 42. At some point prior to injection to the mixing device 36, the feed water is treated by addition of a chemical scale control additive, described above, at 44 by a proportioning pump and tank (shown schematically at 45) as is well known in the art.

The feed water is preferably heated to a few degrees below its boiling point in the heat exchanger 32.

In the deaerator 42, noncondensable gases, including nitrogen, oxygen and a small amount of carbon dioxide, are removed from the feed water by scrubbing, preferably against steam. The deaerator 42 is preferably a packed tower, and feed water is injected to the tower 42 by a spray head 46, or another water distributing device.

Steam vented from the calandria 14 and which contains $CO_2$ liberated in the decomposition of bicarbonate ions present in the feed water is injected to the bottom of the deaerator tower at 47, and is preferably provided to the daerator through a line 48 leading from a vent valve 49 in the shell side of the evaporator 10. Injection of steam to the bottom of the deaerator tower 42 aids in freeing noncondensable gases from the downcoming feed water, and preheats the feed water to a temperature substantially equal to or, preferably, exceeding the temperature of water circulating in the evaporator 10. Contacting the vent stream in line 48 with relatively cool seawater feed concentrates the $CO_2$ present in the line 48 in the gas stream in a line 50 leaving the deaerator 42.

The noncondensable gases and a minor amount of steam flow from the deaerator 42 through the line 50 to a vent valve 51. A minor portion of noncondensable gases is vented from the line 50 through the vent valve 51, and the major portion (e.g. about 80%) of the noncondensable gases flows through a valve 52 and a line 60 to a carbon dioxide injection means, generally designated 61, best seen in FIG. 2. The carbon dioxide injector 61 comprises a perforated pipe 62 attached to one end of the line 60, and is positioned below the level of the brine within the evaporator 10.

In an alternative embodiment, a minor portion of the seawater feed stream is diverted from line 35 via a line 63 (shown in dotted line) to a small tower 64 in which the feed water absorbs carbon dioxide supplied from the deaerator 42 by line 65. Noncondensable gases are vented from the tower 64 by a line 66, and carbon dioxide-laden water is supplied to the carbon dioxide injector by a pump 67 in a line 68.

In either embodiment, deaerated feed water flows through a line 70 from the bottom of the deaerator 42 to the bottom portion of the evaporator 10. There is a slight pressure drop from the deaerator 42 to the evaporator 10 to allow fluid flow. A liquid level control 72 in the deaerator controls a valve 74 in the line 70 so that the liquid level in the deaerator 42 remains essentially constant. (Alternatively, a liquid seal loop (not shown) which may include a flow-restricting orifice, between the deaeration and evaporator may be used to restrict flow of vapor from the deaerator to evaporator.)

By control of the valve 52 in the gas line 60 in combination with the vent valve 51, the rate of injection of carbon dioxide and small amounts of other noncondensable gases into the brine of the evaporator 10 is controlled.

The pressure within the evaporator 10 is maintained at slightly above atmospheric (e.g. about 1 psig) such that the brine boils at about 216.7° F. (a boiling point elevation of about 1.7° F.) with the vapor condensing in the tubes 14 at about 223° F., for a net $\Delta T$ of about 6.3° F.

The portions of the evaporator 10 in contact with brine are generally manufactured of aluminum brass or a copper-nickel (90/10) alloy.

A series of seawater distillate tests were conducted using a vapor compression distillation apparatus as shown in FIGS. 1 and 2, Mechanical Equipment Co. (MECO) Model M3B, rated at 300 gal/hr (nominal distillate output rate), with chemical scale control additive, both with and without carbon dioxide injection. (The source of carbon dioxide was vent gas from the deaerator 42.)

The P alkalinity of cold feed seawater was substantially zero, and the M alkalinity of the feed remained substantially unchanged during testing at about 110–120 ppm. The pH of the feed varied between about 7.8 and 8.2.

Table I gives the results of the tests in terms of running time, average brine concentration factors, fouling factors ($R_d$), brine pH and P alkalinities, and blowdown and distillate copper contents.

Table I indicates that runs 5 and 6, which utilize carbon dioxide injection and a chemical scale control additive such that blowdown P alkalinities were relatively low, exhibited fouling factors per 100 hours running time on the order of one-half of those runs without carbon dioxide injection, without a substantial increase in blowdown and distillate copper contents. (Such copper contents are indicative of the rate of corrosion.)

TABLE I

| Run No. | Running Time (Hours) | Average Concentration Factor | Average Blowdown pH | P Alkalinity (ppm CaCO3) | Fouling Factor $R_d$[a] | $R_d$/100 hrs[a] | Cu in Blowdown - ppm | Cu in Distillate - ppm | Evaporator[b] Treatment |
|---|---|---|---|---|---|---|---|---|---|
| 1 | 190.5 | 1.8 | 9.85 | 131 | $2.83 \times 10^{-4}$ | $1.483 \times 10^{-4}$ | 0.1–0.2 | [d] | 12 ppm MECO M-209 No $CO_2$ injection |
| 2 | 144 | 1.8 | 9.90 | 120 | $2.25 \times 10^{-4}$ | $1.562 \times 10^{-4}$ | 0.1–0.2 | [d] | 12 ppm MECO M-209 No $CO_2$ injection |
| 3 | 192 | 1.9 | 9.60 | 133 | $1.93 \times 10^{-4}$ | $1.010 \times 10^{-4}$ | [d] | [d] | Belgard EVN 12 ppm No $CO_2$ injection |
| 4 | 100 | 1.9 | 9.55 | 134 | $1.20 \times 10^{-4}$ | $1.198 \times 10^{-4}$ | 0.2 | [d] | 6 ppm MECO M-209 + 3¼ ppm MECO M-235 $CO_2$ injection |
| 5 | 164 | 1.8 | 9.50 | 95 | $1.15 \times 10^{-4}$ | $0.703 \times 10^{-4}$ | 0.2 | 0.1 | 6 ppm MECO M-209 + 3¼ ppm MECO M-235 $CO_2$ injection |
| 6 | 163 | 1.9 | 9.20 | 76 | $0.66 \times 10^{-4}$ | $0.405 \times 10^{-4}$ | 0.2 | 0.2 | 6 ppm MECO M-209 + 3¼ ppm MECO M-235 Increased $CO_2$ injection[c] |

[a](BTU/hr-ft.$^2$ −°F.)$^{-1}$
[b]All treatment concentrations are based on feedwater flow rates.
[c]$CO_2$ injection rate in Run No. 6 (as compared to Run No. 5) was effected by adjustment of valves 52 and 51, FIG. 1.
[d]No tests for Cu were made.

EXAMPLE 2

Vapor Compression Distillation With Addition of $CO_2$ Via Feed Side Stream

Figure 3:
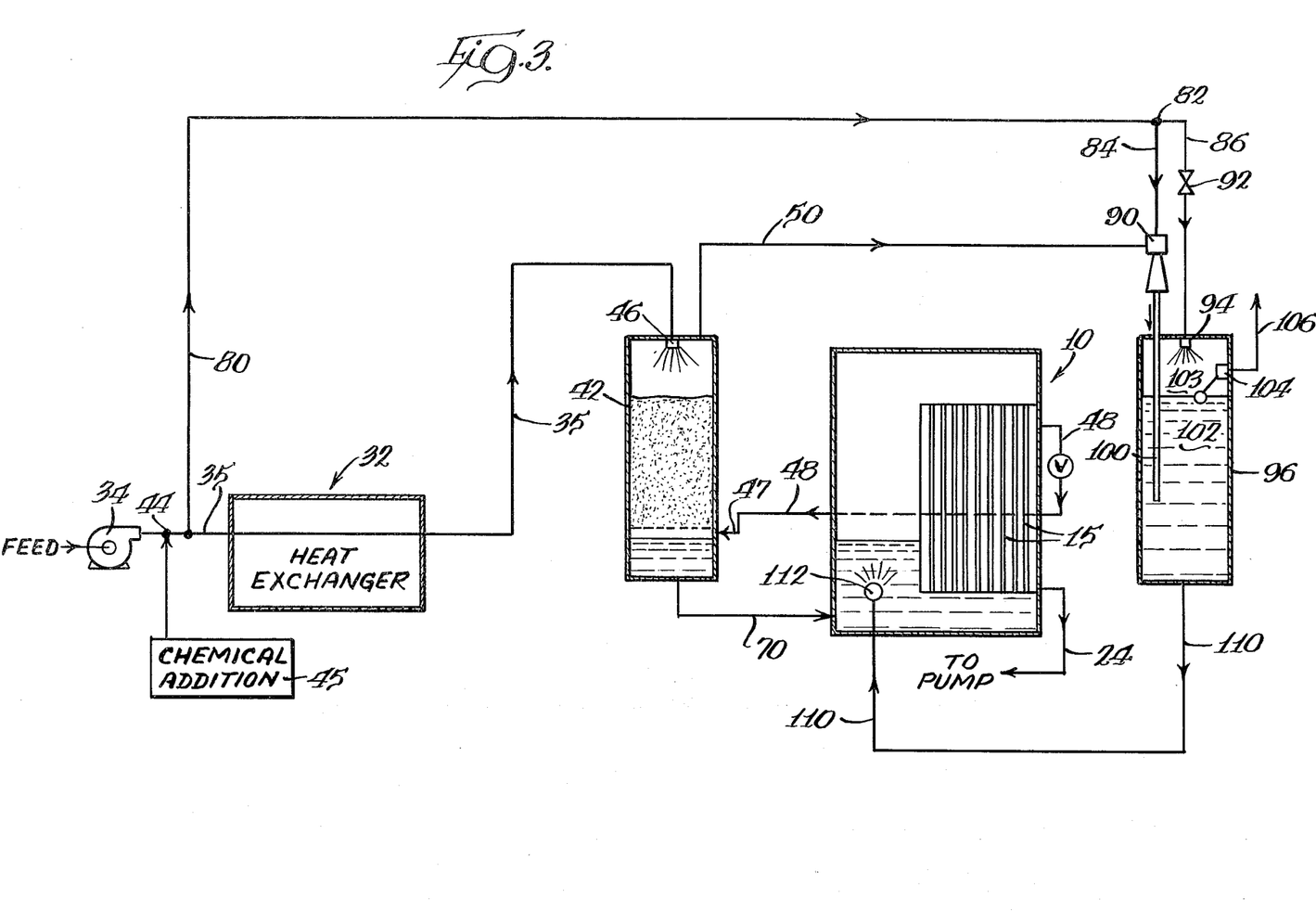
FIG. 3 is a schematic diagram, partially in section, of a preferred embodiment of a vapor compression distillation apparatus embodying the present invention.

FIG. 3 is a schematic representation of an alternative embodiment of the vapor compression distillation system of FIG. 1, illustrating preferred means for dissolving carbon dioxide in a side stream of feed sea water for ultimate delivery to brine. (Elements common to both FIGS. 1 and 3 are designated by common reference numerals. Some elements of FIG. 1, such as the compressor 12, various valves, and the distillate and blowdown lines running through the heat exchanger 32 are omitted in FIG. 3 for clarity.)

In the system of FIG. 3, cold (e.g. 80° F.) feed seawater, after addition of chemical additive at point 44, is split into a side stream (line 80) and a main feed stream (line 35). The feed pH is about 8.3. The respective flow rates in lines 80 and 35 may be, for example, about one gallon per minute (gpm) and about 12 gpm. The feed water in line 35 is pumped by pump 34 through the heat exchanger 32 where it is heated by heat exchange with distillate and blowdown lines (not shown), and directed to the spray head 46 of the deaerator 42.

The side stream 80, is split at point 82 into two streams 84 and 86. Stream 84, at a rate of about 0.8 gpm, is directed to an eductor 90. Line 86, at a rate of about 0.2 gpm, is directed through a valve 92 to a spray head 94 of a $CO_2$/seawater contacting column 96. (Alternatively, a water inlet (not shown) may be substituted for the spray head 94.)

A suitable eductor is the Penberthy Model LM ½" eductor.

The eductor 90 also communicates with a vent line 50 from the deaerator 42 which carries non-condensable gases ($O_2$ and $N_2$), $CO_2$ and a minor amount of water vapor.

In the eductor 90, the feed water in stream 84 is pressurized and mixed with the vent gases from line 50, and injected into a submerged line 100, which terminates within the column 96 below the surface of a quantity of seawater 102 therein.

Upon injection into the seawater 102, the water vapor and most of the $CO_2$ in line 100 are dissolved in the seawater 102. The non-condensable gases and a minor amount of $CO_2$ do not dissolve, and are collected in a vapor space 103 in the column 96 above the surface of the water 102.

Cold seawater introduced into the column by the spray head 94 absorbs most of the $CO_2$ present in the vapor space 103. Undissolved $CO_2$ and noncondensables are vented from the vapor space 103 by a vent valve 104, and are discharged to the atmosphere through a line 106. (The valve 104 is illustratively a float-type valve, but may comprise a needle-type manual bleed valve, or other suitable type of valve.)

Carbon dioxide-enriched feed water is pumped (pump not shown) from the column 96 through line 110 to a sparger 112 disposed beneath the level of brine in the evaporator 10. (The evaporator 10 is fed deaerated seawater through line 70 as described in connection with the system of FIG. 1 above.)

EXAMPLE 3

Multi-Stage and Multi-Effect Evaporators

As noted above, the method of the invention is applicable to forms of seawater distillation apparatus other than the vapor compression apparatus of FIG. 1. Examples of distillation units to which the method may be applied include multi-stage flash units and multi-effect vertical or horizontal tube evaporators.

Various types of multiple stage and multiple effect distillation systems are well-known by those skilled in the art. Checkovich U.S. Pat. No. 3,218,241, for example, describes two embodiments of multi-stage flash evaporation units, both once-through (without recycle) and with recycle, used for seawater desalination.

In general, multi-stage and multi-effect evaporators comprise a series of preceding and succeeding stages, each stage comprising a brine holding space and a vapor condensing space. The brine holding space is defined as the portion of each stage in which brine is boiling (or flashing) or is about to be boiled (or flashed). Respective succeeding stages operated at lower pressures than preceding stages.

In applying the method of the invention to multi-stage flash evaporators, it is desirable to introduce recycled $CO_2$ into the brine of the final stage instead of prior stages so that once introduced, absorbed $CO_2$ will not be subjected to boiling until after it has been pumped through heat exchanger tubes. In this manner, $CO_2$ is reserved for its primary job of reducing scale formation in the stage condensors (vapor condensing spaces). However, because brine conditions in the flashing chambers (brine holding spaces) may tend to produce magnesium hydroxide scale on those chamber walls which operate at relatively high temperatures, some $CO_2$ introduction in the high temperature stages may also be desirable in order to prevent scale build-up therein.

Since each successive stage in a multi-stage flash evaporator operates at a low pressure level compared to its preceding stage, each stage condensor may be vented into the brine section of its immediately succeeding stage, and thereby replace much of the carbon dioxide liberated by the brine in the preceding stage. It is possible in this manner to avoid extreme chemical conditions in the brine which tend to promote formation of magnesium hydroxide scale throughout the distillation apparatus.

In some cases, however, it may be necessary to vent carbon dioxide from a stage condensor to the brine of the second or third succeeding stage in order to provide a sufficient pressure drop to make carbon dioxide injection practical since, in some multi-stage flash units, the pressure drop between immediately succeeding stages is relatively small. This problem is aggravated since carbon dioxide is preferably injected at a substantial brine depth.

Another approach in multi-stage flash evaporators is to collect carbon dioxide-rich streams from banks of stages, and inject the collected carbon dioxide to the brine at some point in the unit lower in pressure.

In the case of multi-effect vertical or horizontal tube evaporators, $CO_2$-rich streams should be vented from the vapor condensing sections of the respective effects and mixed into the brine of succeeding effects.

It will be appreciated by those skilled in the art that the method and apparatus described above allow seawater desalination, or other evaporative operations on brackish water, to be performed with elimination or substantial reduction of alkaline scale formation with no substantial increase in distillate and brine corrosion characteristics. Thus, output capacity may be maintained over substantial operating periods without a decrease in throughput caused by scaling of tube or other surfaces.

From the foregoing detailed description, it will be apparent to those skilled in the art that the present invention resides in the limited reduction of the P alkalinity and pH of chemical additive-treated brine by addition of carbon dioxide thereto whereby the scale inhibiting performance of the chemical additive is greatly enhanced. This effect is attained without the undesirable side effect of a significant increase in corrosive tendencies of the brine, since the concentration of free carbon dioxide in the brine is limited.

The desired pH and P alkalinity ranges set forth herein are desirable with the presently commercially available chemical additives identified herein. Should chemicals capable of inhibiting alkaline scale formation at higher P alkalinities and pH levels be developed in the future, it is contemplated that the objects of the invention will be obtainable with such chemicals by the means taught herein, i.e. by reducing the P alkalinity and pH of brine treated by such chemicals by addition of carbon dioxide. Thereby, the alkaline scale inhibiting characteristics of such chemicals will be enhanced.

The foregoing detailed description is given for clearness of understanding only and no unnecessary limitations should be understood therefrom, as modifications will be obvious to those skilled in the art.

I claim:

1. A method of reducing or substantially eliminating alkaline scale formation on process equipment surfaces which are in contact with evaporating alkaline brine which contains at least one high-temperature chemical scale control additive, which additive effects threshold alkaline scale inhibition, said method comprising the step of dissolving in said brine subsequent to or simultaneously with evaporation thereof an amount of carbon dioxide sufficient to substantially reduce bicarbonate ion decomposition in said brine, yet insufficient to result in substantial amounts of chemically uncombined carbon dioxide in said brine, such that the pH of the brine is maintained at about 8.7 or above as measured at room temperature, and the concentration of chemically uncombined carbon dioxide in the brine is maintained at less than about 1 ppm, whereby corrosive conditions and alkaline scale formation are avoided.

2. The method of claim 1 wherein said high-temperature scale control additive is chosen from the group consisting of polymers and copolymers of maleic acid, polyphosphonates, phosphonic acid derivatives, aminophosphonic acid derivatives, polymethacrylic and polyacrylic acid derivatives, polyolesters, or mixtures thereof.

3. The method of claim 1 wherein the amount of carbon dioxide dissolved is such that the P alkalinity of said brine is maintained between about 20 and 90 ppm expressed as equivalent calcium carbonate, and the pH of the brine is maintained at less than or equal to about 9.3.

4. The method of claim 3 wherein said chemically uncombined carbon dioxide concentration in the brine is less than about 0.5 ppm.

5. A method of reducing or substantially eliminating alkaline scale formation on evaporative heat transfer surfaces which are in contact with boiling or flashing alkaline brine which contains a substantial amount of carbonate ions formed by decomposition of bicarbonate ions present in said brine, said brine also containing a high-temperature chemical scale control additive selected from the group consisting of polymers and copolymers or maleic acid, polyphosphonates, phosphonic acid derivatives, aminophosphonic acid derivatives, polymethacrylic and polyacrylic acid derivatives, polyolesters, or mixtures thereof, said method comprising the step of dissolving in said brine subsequent to or simultaneously with boiling or flashing thereof an effective amount of carbon dioxide such that the P alkalinity of said brine is maintained at between about 20 and 90 ppm expressed as equivalent calcium carbonate, the pH of the brine is maintained at between about 8.7 and 9.3 as measured at room temperature, and the concentration of chemically uncombined carbon dioxide in said brine is less than about 1 ppm.

6. The method of claim 5 wherein said chemically uncombined carbon dioxide concentration in the brine is less than about 0.5 ppm.

7. The method of claim 5 wherein said carbon dioxide is supplied to said brine by injection and mixing of gaseous carbon dioxide directly into said brine.

8. The method of claim 5 wherein said carbon dioxide is supplied to said brine by dissolving gaseous carbon dioxide in a relatively cool water stream, and mixing said carbon dioxide-laden water stream with said brine.

9. The method of claim 8 wherein said water stream comprises a side stream of a feed water stream.

10. The method of claim 5 wherein said carbon dioxide is provided to said brine by collecting noncondensable gases liberated from said brine by boiling or flashing, and recycling said gases to said brine.

11. In a method of inhibiting alkaline scale formation in brine which is to be evaporated wherein a high-temperature chemical scale control additive which effects threshold scale inhibition is present in said brine during said evaporation, the improvement which comprises the step of adding carbon dioxide to said brine subsequent to or simultaneously with said evaporation in order to lower the P alkalinity and pH of said brine relative to brine treated with said additive alone whereby the scale inhibiting ability of said additive is enhanced, the pH of said brine after carbon dioxide addition being at least about 8.7 as measured at room temperature and the concentration of chemically uncombined carbon dioxide in said brine being less than about 1 ppm.

12. A method of reducing or substantially eliminating alkaline scale formation on process equipment surfaces which are in contact with evaporating alkaline brine at a temperature of 190° F. or above, which brine contains at least one high-temperature chemical scale control additive which effects threshold alkaline scale inhibition, said method comprising the step of dissolving in said brine subsequent to or simultaneously with evaporation thereof an amount of carbon dioxide sufficient to reduce or substantially eliminate bicarbonate ion decomposition in said brine, yet insufficient to result in substantial amounts of chemically uncombined carbon dioxide in said brine, such that the pH of the brine is maintained at about 8.7 or above as measured at room temperature, and the concentration of chemically uncombined carbon dioxide in the brine is maintained at less than about 1 ppm whereby corrosive conditions and alkaline scale formation are avoided.

13. The method of claim 12 wherein said high-temperature chemical scale control additive is chosen from the group consisting of ploymers and copolymers of maleic acid, polyphosphonates, phosphonic acid derivatives, aminophosphonic acid derivatives, polymethacrylic and polyacrylic acid derivatives, polyolesters, or mixtures thereof.

14. The method of claim 12 wherein the amount of carbon dioxide dissolved is such that the P alkalinity of said brine is maintained between about 20 and 90 ppm expressed as equivalent calcium carbonate, and the pH of the brine is maintained at less than or equal to about 9.3.

15. The method of claim 14 wherein said chemically uncombined carbon dioxide concentration in the brine is less than about 0.5 ppm.

16. A method of reducing or substantially eliminating alkaline scale formation on evaporative heat transfer surfaces which are in contact with alkaline brine at least a portion of which has been heated to a temperature of about 190° F. or above, which brine contains a substantial amount of carbonate ions formed by decomposition of bicarbonate ions present in said brine and a high-temperature chemical scale control additive selected from the group consisting of polymers and copolymers of maleic acid, polyphosphonates, phosphonic acid derivatives, aminophosphonic acid derivatives, polymethacrylic and polyacrylic acid derivatives, polyolesters, or mixtures thereof, said method comprising the step of dissolving in said brine subsequent to or simultaneously with evaporation thereof an amount of carbon dioxide such that the P alkalinity of said brine is maintained a between about 20 and 90 ppm expressed as equivalent calcium carbonate, the pH of the brine is maintained at between about 8.7 and 9.3 as measured at room temperature, and the concentration of chemically uncombined carbon dioxide in said brine is less than about 1 ppm.

17. The method of claim 16 wherein said chemically uncombined carbon dioxide concentration in the brine is less than about 0.5 ppm.

18. In a method of inhibiting alkaline scale formation in brine which contains a substantial amount of carbonate ions formed by decomposition of bicarbonate ions present in said brine wherein a high-temperature chemical scale control additive which effects threshold scale inhibition is present in said brine during said decomposition, the improvement which comprises the step of adding carbon dioxide to said brine subsequent to or simultaneously with said decomposition in order to lower the P alkalinity and pH of said brine relative to brine treated with said additive alone whereby the scale inhibiting ability of said additive is enhanced, such that the pH of said brine after carbon dioxide addition is at least about 8.7 as measured at room temperature and the concentration of chemically uncombined carbon dioxide in said brine is less than about 1 ppm.

19. The improvement of claim 18 wherein said carbon dioxide is added to said brine by dissolving gaseous carbon dioxide in a relatively cold water stream and mixing said carbon dioxide-laden water stream with said brine.

20. The improvement of claim 18 wherein said water stream comprises a side stream of a feed water stream.

21. The improvement of claim 20 wherein carbon dioxide is provided to said feed water side stream by collecting noncondensable gases liberated from said brine by an evaporative process, and directing said gases to said side stream for mixing therewith.

22. The improvement of claim 21 wherein said mixing of said feed water side stream and said gases is effected by mixing and pressurizing said gases and said side stream in an eductor.

23. The improvement of claims 18, 20, 21 or 22 wherein said relatively cool water comprises seawater.

24. A method of reducing or substantially eliminating alkaline scale formation on liquid contact surfaces of a multi-stage evaporator which comprises a series of preceding and succeeding stages, each said stage comprising a brine holding space and a vapor condensing space with a pressure drop between adjacent preceding and succeeding stages wherein alkaline brine flows from each preceding stage to an adjacent succeeding stage, a portion of said brine being evaporated in said succeeding stage, said brine containing at least one high-temperature chemical scale control additive which effects threshold alkaline scale inhibition and a substantial amount of carbonate ion resulting from decomposition of bicarbonate ion in said brine during evaporation, said method comprising the step of dissolving in said brine during evaporation an amount of carbon dioxide sufficient to substantially reduce the rate and extent of bicarbonate ion decomposition in said brine, yet insufficient to result in substantial amounts of chemically uncombined carbon dioxide in said brine, such that the pH of the brine is maintained at about 8.7 or above as measured at room temperature, and the concentration of chemically uncombined carbon dioxide in the brine is maintained at less than about 1 ppm whereby corrosive conditions and alkaline scale formation are avoided.

25. The method of claim 24 wherein at least a portion of said carbon dioxide is dissolved in said brine by the steps of recycling said carbon dioxide from the vapor condensing space of a preceding stage to the brine holding space of a succeeding stage.

26. The method of claim 24 wherein said chemical scale control additive is chosen from the group consisting of polymers and copolymers of maleic acid, polyphosphonates, phosphonic acid derivatives, aminophosphonic acid derivatives, polymethacrylic and polyacrylic acid derivatives, polyolesters, or mixtures thereof.

27. The method of claim 24 wherein the amount of carbon dioxide dissolved is such that the P alkalinity of said brine is maintained between about 20 and 90 ppm expressed as equivalent calcium carbonate, and the pH of the brine is maintained at about 9.3 or below.

28. The method of claim 27 wherein said chemically uncombined carbon dioxide concentration in the brine is less than about 0.5 ppm.

29. The method of claim 24 wherein said carbon dioxide is recycled from the vapor condensing spaces of a plurality of preceding stages to the brine holding space of at least one stage succeeding each of said plurality of preceding stages.

30. A method of reducing or substantially eliminating alkaline scale formation on evaporative heat transfer surfaces which are in contact with boiling or flashing alkaline seawater brine at a temperature of 190° F. or above, which brine contains a substantial amount of carbonate ions formed by decomposition of bicarbonate ions present in said brine, said brine also containing a high-temperature chemical scale control additive selected from the group consisting of polymers and copolymers of maleic acid, polyphosphonates, phosphonic acid derivatives, aminophosphonic acid derivatives, polymethacrylic and polyacrylic acid derivatives, polyolesters, or mixtures thereof, said method comprising the step of dissolving in said brine subsequent to or simultaneously with boiling or flashing thereof an effective amount of carbon dioxide such that the P alkalinity of said brine is maintained at between about 20 and 90 ppm expressed as equivalent calcium carbonate, the pH of the brine is maintained at between about 8.7 and 9.3 as measured at room temperature, and the concentration of chemically uncombined carbon dioxide in said brine is less than about 1 ppm, whereby corrosive conditions and alkaline scale formation are avoided.

31. The method of claim 30 wherein said chemically uncombined carbon dioxide concentration in the brine is less than about 0.5 ppm.

32. The method of claim 30 wherein said carbon dioxide is supplied to said brine by injection and mixing of gaseous carbon dioxide directly into said brine.

33. The method of claim 30 wherein said carbon dioxide is supplied to said brine by dissolving gaseous carbon dioxide in a relatively cool water stream, and mixing said carbon dioxide-laden water stream with said brine.

34. The method of claim 33 wherein said water stream comprises a side stream of a seawater feed stream.

35. The method of claim 30 wherein said carbon dioxide is provided to said brine by collecting noncondensable gases liberated from said brine by boiling or flashing, and recycling said gases to said brine.

36. The improvement of claim 18 wherein at least a portion of said carbon dioxide is carbon dioxide which is recovered from the decomposition of said bicarbonate ions and recycled to said brine.

37. The improvement of claim 22 including the further step of contacting sid mixed gases and side stream from said eductor with relatively cool water.

38. A method of reducing or substantially eliminating alkaline scale formation on liquid contact surfaces of an evaporator wherein boiling or flashing alkaline brine contains at least one high-temperature chemical scale control additive which effects threshold alkaline scale inhibition and a substantial amount of carbonate ions resulting from decomposition of bicarbonate ions in said brine during evaporation, said method comprising the steps of:

(a) condensing at least a portion of the water in the vapor stream produced during said boiling or flashing, said stream comprising water vapor, carbon dioxide produced by decomposition of said bicarbonate ions, and other noncondensable gases, so as to enrich the carbon dioxide concentration of said vapor stream; and, (b) introducing at least a portion of said carbon dioxide-enriched vapor stream to said boiling or flashing brine in an amount sufficient to substantially reduce the rate and extent of bicarbonate ion decomposition in said brine, yet insufficient to result in substantial amounts of chemically uncombined carbon dioxide in said brine, such that the pH of said brine is maintained at about 8.7 or above as measured at room temperature, and the concentration of chemically uncombined carbon dioxide in said brine is maintained at less than about 1 ppm whereby corrosive conditions and alkaline scale formation are avoided.

39. The method of claim 38 wherein said carbon dioxide is introduced to said brine in gaseous form by direct injection.

40. The method of claim 38 wherein said carbon dioxide is introduced to said brine by dissolving gaseous carbon dioxide in a relatively cool water stream, and mixing said carbon dioxide-laden water stream with said brine.

41. The method of claim 40 wherein said water stream comprises a side stream of a seawater feed stream.

42. The method of claim 38 wherein said scale control additive is chosen from the group consisting of polymers and copolymers of maleic acid, polyphosphonates, phosphonic acid derivatives, aminophosphonic acid derivatives, polymethacrylic and polyacrylic acid derivatives, polyesters, or mixtures thereof.

43. The method of claim 38 wherein the amount of carbon dioxide dissolved is such that the P alkalinity of said brine is maintained between about 20 and 90 ppm expressed as equivalent calcium carbonate, and the pH of said brine is maintained at less than or equal to about 9.3.

44. The method of claim 38 wherein said concentration of chemically uncombined carbon dioxide is less than about 0.5 ppm.

* * * * *

UNITED STATES PATENT AND TRADEMARK OFFICE
CERTIFICATE OF CORRECTION

PATENT NO. : 4,444,675
DATED : April 24, 1984
INVENTOR(S) : Richard W. Goeldner

It is certified that error appears in the above-identified patent and that said Letters Patent is hereby corrected as shown below:

Columns 9-10, Table I, Run 4, change the entry under "Evaporator Treatment" to read -- 6 ppm MECO M-209 +
3½ ppm MECO M-235
No $CO_2$ Injection --

Signed and Sealed this

Second Day of August, 1988

Attest:

DONALD J. QUIGG

*Attesting Officer*    *Commissioner of Patents and Trademarks*